(12) United States Patent
Roush et al.

(10) Patent No.: US 9,378,387 B2
(45) Date of Patent: Jun. 28, 2016

(54) MULTI-LEVEL SECURITY CLUSTER

(75) Inventors: Ellard Roush, Burlingame, CA (US); Tirthankar Das, Kolkata (IN); Sambit Nayak, Bhubaneswar (IN)

(73) Assignee: Oracle International Corporation, Redwood City, CA (US)

( * ) Notice: Subject to any disclaimer, the term of this patent is extended or adjusted under 35 U.S.C. 154(b) by 660 days.

(21) Appl. No.: 12/730,819

(22) Filed: Mar. 24, 2010

(65) Prior Publication Data

US 2011/0238984 A1 Sep. 29, 2011

(51) Int. Cl.
*G06F 21/62* (2013.01)
*G06F 21/53* (2013.01)
*H04L 29/06* (2006.01)

(52) U.S. Cl.
CPC ........... *G06F 21/6218* (2013.01); *G06F 21/53* (2013.01); *G06F 2221/2113* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 6,023,765 A * | 2/2000 | Kuhn | 726/4 |
| 6,473,800 B1 * | 10/2002 | Jerger et al. | 709/226 |
| 7,356,695 B2 * | 4/2008 | LiVecchi | 713/166 |
| 7,546,334 B2 * | 6/2009 | Redlich et al. | 709/201 |
| 7,657,925 B2 * | 2/2010 | Pesati et al. | 726/1 |
| 7,716,718 B2 * | 5/2010 | Asada et al. | 726/2 |
| 7,895,326 B2 * | 2/2011 | Jerrim et al. | 709/224 |
| 8,200,738 B2 | 6/2012 | Roush et al. | |
| 2002/0103903 A1 * | 8/2002 | Bruton et al. | 709/225 |
| 2004/0226017 A1 * | 11/2004 | Leonard et al. | 718/104 |
| 2005/0188321 A1 | 8/2005 | Adams et al. | |
| 2006/0265489 A1 | 11/2006 | Moore | |
| 2007/0113283 A1 | 5/2007 | Hrabik et al. | |
| 2007/0244895 A1 | 10/2007 | Mohler et al. | |
| 2008/0066172 A1 | 3/2008 | Tarsi | |
| 2009/0007126 A1 * | 1/2009 | Jelinek et al. | 718/104 |

(Continued)

FOREIGN PATENT DOCUMENTS

EP 849680 A2 * 6/1998

OTHER PUBLICATIONS

System Administration Guide: Solaris Containers-Resource Management and Solaris Zones, published 2007.*

(Continued)

*Primary Examiner* — Benjamin Lanier
(74) *Attorney, Agent, or Firm* — Polsinelli PC

(57) ABSTRACT

Some embodiments may include multiple computers comprising a multi-level security system. The security system includes a first set of zones and a second set of zones, each having access to resources of a computer, a first security container having a first security label containing the first set of zones, and a second security container with a second security label containing the second set of zones. The resources and data of each of the first and second set of zones inherit the security label of their corresponding security container. The security system further includes a global zone, the global zone has access to the resources of the computer, a kernel having access to the security label information for each security container and zone, where requests for data and resources stored on the computer are first sent to the kernel, and the kernel adds the security label data, the kernel or the global zone on any computer perform security checks, and then the request may then be processed by the kernel or global zone on any computer.

20 Claims, 11 Drawing Sheets

(56) References Cited

U.S. PATENT DOCUMENTS

2009/0089406 A1* 4/2009 Roush et al. .................. 709/220
2010/0306534 A1* 12/2010 Teijido et al. ................. 713/166

OTHER PUBLICATIONS

Faden, "Solaris Trusted Extensions: Architecture Overview", Apr. 2006, pp. 1-11.*
Solaris 10 Nov. 2006 Trusted Extensions Security Target, Version 1.2 Public Release, Apr. 30, 2008, pp. 1-108.*
Non-Final Office Action regarding to U.S. Appl. No. 12/178,358, Apr. 22, 2010.
Amendment and Response to Non-Final Office Action regarding U.S. Appl. No. 12/178,358, Aug. 23, 2010.
Final Office Action regarding U.S. Appl. No. 12/178,358, Nov. 4, 2010.
Amendment and Response to Final Office Action regarding U.S. Appl. No. 12/178,358, Mar. 4, 2011.
Non-Final Office Action regarding U.S. Appl. No. 12/178,358, Dec. 20, 2012.
Faden, Glen, Solaris Trusted Extensions, Sun Microsystems, Apr. 2006.
Brunette, Glenn and Victor, Jeff, Understanding the Security Capabilities of Soloris Zones Software, Sun Microsystems, Dec. 21, 2008.
Oracle Solaris with Trusted Extensions, Oracle, Dec. 2007.
Faden, Glenn, Comparing the Multilevel Security Policies of the Solaris Trusted Extensions and Red Hat Enterprises Linux Systems, Sun Microsystems, Feb. 2007.
Faden, Glenn, Solaris Trusted Extensions and Red Hat Enterprise Linux: Multilevel Security Policy Feature Summary Comparison, Sun Microsystems, Feb. 2007.
Response to Final Office Action regarding U.S. Appl. No. 12/178,358, Oct. 3, 2013.
Advisory Action re U.S. Appl. No. 12/178,358, dated Oct. 23, 2013.
Response to Advisory Action re U.S. Appl. No. 12/178,358, dated Nov. 4, 2013.
Amendment and Response to Non-Final Office Action regarding U.S. Appl. No. 12/178,358, Mar. 20, 2013.
Final Office Action regarding U.S. Appl. No. 12/178,358, Jul. 3, 2013.
Notice of Allowance regarding U.S. Appl. No. 12/178,358, dated Mar. 27, 2015.

* cited by examiner

MULTI-LEVEL SECURITY CLUSTER

TECHNICAL FIELD

The invention relates generally to clusters of computers and specifically to security for clusters of computers.

BACKGROUND

Government organizations, such as military and intelligence agencies, and large financial institutions have very stringent security policies. They classify data using various security tags and users are given fine grained access rights to such data. For instance, data may be marked with security levels, such as unclassified, confidential, secret, classified, top secret, etc. Data may also optionally be marked with additional security information, called a compartment, and multiple compartments may be used in a single security label. For example, one item may be labeled "confidential foo" and another item may be labeled "secret bar." An important aspect of security with these systems is that users may have different security access rights. For example, one user may be allowed to access security levels up to confidential and compartment "foo," while a second user may be allowed to access security levels up to top secret and compartment "bar." The second user cannot access items labeled "confidential foo," while the first user does have authorization to access this information. A user must have access rights to both the security level and compartments of the security label for the item being accessed. Traditionally, this stringent security requirement has been termed "Multi-Level Security" (MLS). To satisfy such requirements, various software vendors offer MLS operating environments for single computers, such as RED HAT ENTERPRISE LINUX 5 that incorporates SECURITY ENHANCED LINUX, TRUSTED AIX, TRUSTED HP-UX. SUN MICROSYSTEMS offers SOLARIS TRUSTED EXTENSIONS—a MLS operating system.

MLS operating systems run on a single machine, and therefore the MLS systems suffer from single point of failure. MLS operating systems lack high availability capabilities that allow computing systems to be used to their full potential. For example, the power of computer technology, including CPU, memory, storage, and network, has been growing faster than the needs of many applications. High availability allows redundant computing devices, including processors, storage, and networks, to host multiple applications and resources to share between many users. Without high availability, downtime of applications and services on such deployments can occur due to myriad possible failures, such as application hang, operating system crash, and hardware failure. Therefore, there is a need for MLS systems with high availability capabilities.

SUMMARY

Some embodiments may include computers comprising a multi-level cluster security system. The cluster security system may include a first cluster-wide security container with a first security label. The first security container has a first set of zones, the first set of zones have access to resources of computers. The cluster security system may include a second cluster-wide security container with a second security label. The second container has a second set of zones, where the second set of zones have access to resources of computers. The cluster security system may contain any number of cluster-wide security containers. The cluster security system includes a global zone that has access to the resources of the computer and manages those resources. There may be multiple global zones hosted by the machines comprising the security system, and the combination of all global zones constitutes a global cluster.

The computer resources include an operating system and a kernel and there may be a kernel for each computer or machine used by the system. The kernel supports the zones (including the global zone) hosted on that particular machine. The global zones and the kernel enforce security checks of the system, either in combination or separately. Requests for a computer resource go through the kernel. The kernel adds identifying information to each request, such as the originating zone of the request, and delivers the request to a security checking component. The security checking component may reside in either the global zone, the kernel, or both. Additionally, the security checking component may be done on any kernel or any global zone. Once a request is made, the security component checks to determine if the zone (i.e. the security label of the zone) is authorized to access the requesting data/information.

Some embodiments may include a tangible storage medium including instructions that can be executed by a computer. The instructions may include the following operations. Providing a security label for a resource of a computer. Configuring a zone and providing the zone with a second security label. The zone may include an application. Providing a kernel, where the kernel is in communication with the resource and the zone. Configuring a global zone, where the global zone is in communication with the kernel. Generating a request from the zone, from an application within the zone, and sending the request to the kernel. Adding data corresponding to the second security label of the zone to the request. Comparing the two security labels, and conditionally allowing the application access to the resource depending on outcome of the comparison of the two security labels.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

DETAILED DESCRIPTION

Figure 1A:
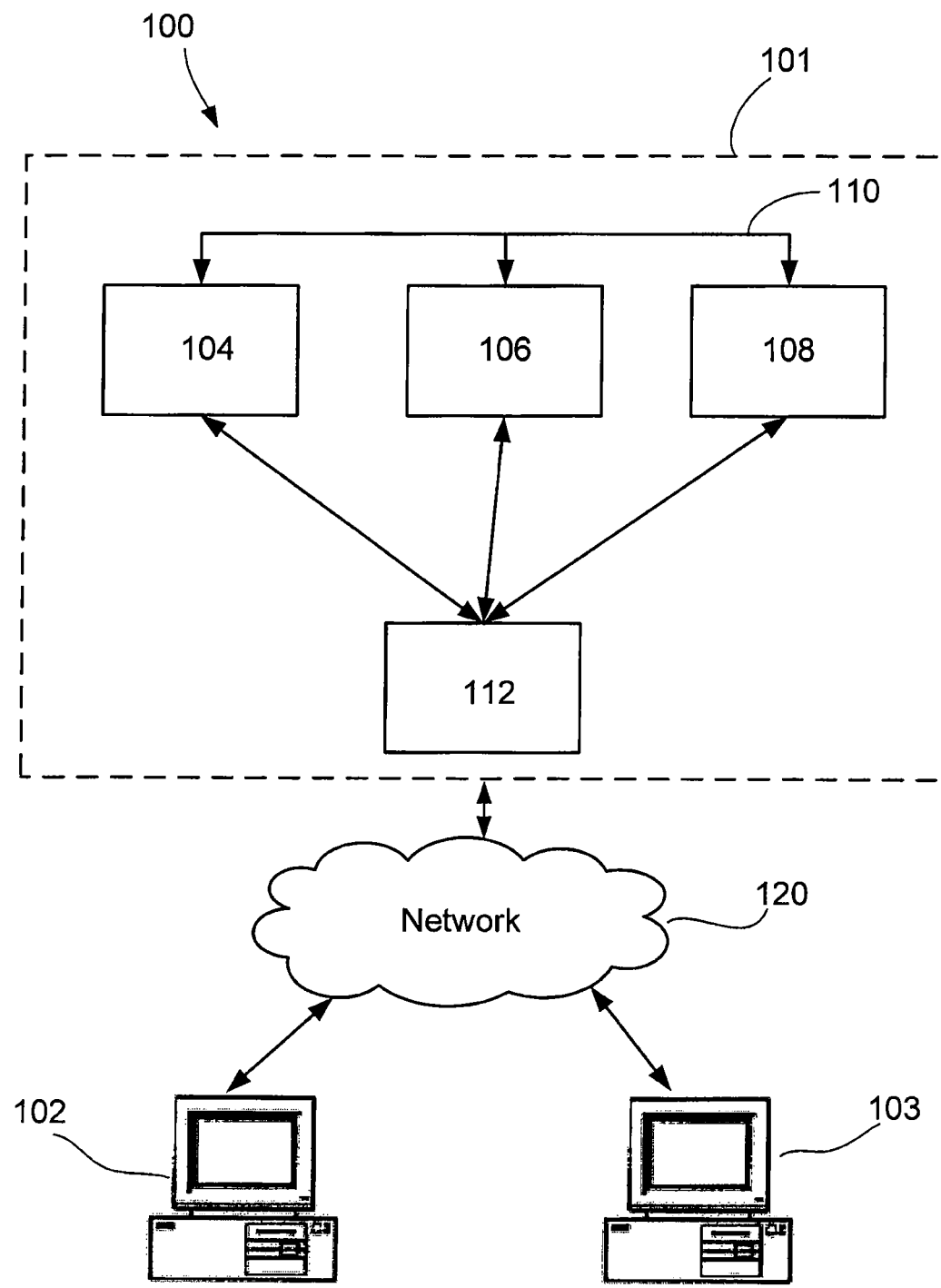
FIGS. 1A and 1B illustrate an example of server virtualization.

Although one or more of the embodiments disclosed herein may be described in detail with reference to a particular software system, the embodiments should not be interpreted or otherwise used as limiting the scope of the disclosure, including the claims. In addition, one skilled in the art will understand that the following description has broad application. For example, while embodiments disclosed herein may focus on cluster virtualization, such as zones, it should be appreciated that the concepts disclosed herein equally apply to other software programs that incorporate virtualization. In addition, it should be appreciated that the concepts disclosed herein may equally apply to other forms of distributed systems, such as grids. Therefore, while embodiments disclosed herein may focus on high availability MLS, the concepts disclosed herein equally apply to other distributed systems that are not highly available. For example, in some embodiments, the multi-level security may be provided on a high performance computing grid that does not support high availability. Furthermore, the concepts disclosed may also be used to implement a lower-level security system, rather than a MLS system. In these embodiments, fewer security checks may be performed and/or the system may operate without certain features. Accordingly, the discussion of any embodiment is meant only to be exemplary and is not intended to suggest that the scope of the disclosure, including the claims, is limited to these embodiments.

Data within an organization often has different sensitivities, such as unclassified, confidential, secret, classified, top secret, etc. It is desirable to protect data from unauthorized access, as well as prevent its misuse by authorized users. It also may be desirable to provide security for data while also providing high availability for resources. In some embodiments, the system provides security containers with security labels, allowing multiple machines to host a number of resources and data. The resources and data are protected from viewing, or from being viewed by any resource or data that does not have the same security label as it.

The term "security label" is intended to refer to an entity marker for a resource (such as data, an application, or the like). The security label identifies the resource or data as having a particular level of security.

The term "cluster machine" or "machine" is intended to refer to a machine that hosts one operating system image or environment. The cluster machine may be either a physical machine or a virtual machine. The operating system has one kernel on the cluster machine.

The term "zone" is intended to refer to an environment provided by the operating system, and the environment is a place where user-level software components run. The zone may be run on a single physical machine or a virtual machine. The operating system provides security isolation, application fault isolation, and resource control for the zone.

The term "global zone" intends to refer to the zone initially provided by the operating system. The global zone has properties different from the other zones. For example, the operating system does not destroy the global zone, and the operating system is not up without the global zone being up.

The term "cluster" is intended to refer to a collection of "zones" that belong to that cluster. As there may be different types of zones, there may also be different types of clusters. The term "global cluster" refers to a collection of global zones located on all machines hosting the cluster. The term "zone cluster" refers to a collection of non-global zones hosted on the machines.

The term "resource" is intended to refer to services, components, or classes of components that may be provided on multiple cluster zones. Resources may include instructions or data. Examples of resources include disk volumes, applications, network addresses, file systems, databases, or the like. The term "resource group" or "resource pool" is intended to refer to any group or collection of resources that run together on the same zone. As used herein, the term "instance" of a resource is intended to refer to a specific component of the class of resources. An instance of a resource may include one or more of an executing thread or process, data, an address, or a logical representation of a component.

The term "cluster-wide security container" is intended to refer to a platform that consists of a set of zones or a cluster, where the zones present in the security container have the same security label. Machines present in the system may host a number of the zones of the cluster-wide security container. The cluster-wide security container provides security isolation to applications running in it. File systems, networks or other resources contained in the cluster-wide security container inherit the security label of the zone.

The term "trusted computing base" is intended to refer to software that enforces the security checks and rules. The trusted computing base resides in a separate location from any untrusted software, such as various applications that have not been screened for security flaws. The trusted computing base may have components that run in the global zone and/or the kernel.

In some embodiments, zones provide application containment. Within a zone, the application may believe that it is running on its own server; however, the kernel and a number of system libraries are shared between the various zones. Multiple zones with the same security label constitute a cluster-wide security container and provide a high availability platform. Processes, file systems, shared devices and networks belonging to such a single cluster-wide security container may move from one system to another as needed, in the case of failures or administrator requests. However, resources, including processes, file systems, shared devices, and network addresses, when moved, remain in the same security container, thus providing both high availability and MLS.

The administration of a security container, in some embodiments is done from a secure location, such as the global zone. The administrator identifies the security label for the cluster-wide security container and specifies what resources may be available in the cluster-wide security container. The security label data is set up so that it can not be modified from inside the cluster-wide security container. Each cluster-wide security container may have a unique security label, and all resources within that cluster-wide security container inherit this label. This means that applications, file systems, storage devices, network communication resources within the security container have the security label of the enclosing security container. As a result, processes and data are associated with a particular security label of the enclosing cluster-wide security container. The system controls access to data and system resources based on comparisons of the security labels of users/processes and the data/resources they desire to access.

FIG. 1A is a block diagram illustrating one embodiment of a cluster. The system 100 may include client devices 102, 103; a cluster 101 containing zones 104, 106 and 108; a network 120; and disk storage 112. In one embodiment, the cluster 101 may be a high availability (HA) cluster, a high performance cluster, a load balanced cluster, or the like. The zones 104, 106 and 108 may exist on virtual machines or physical machines. The client devices 102, 103 may include any computing device capable of connecting to another computing device to send and receive information, including web requests for information from a server device, or the like.

The client devices 102, 103 may communicate with the network 120 employing a variety of network interfaces and associated communication protocols. The network 120 may be configured to couple client devices 102, 103, with other network devices, such as cluster zone devices corresponding to zone 104, 106, 108, or the like.

As shown, the cluster 101 includes the zones 104, 106 and 108. The cluster 101 is a collection of zones that may operate together to provide various services. As shown, zones 104, 106 and 108 may be coupled to each other by one or more interconnects 110. The cluster 101 further includes one or more storage devices 112 that may be shared by the zones 104, 106 and 108, or a subset thereof. When the cluster 101 is booted (e.g., when the zones 104, 106 and 108 of cluster 101 are initialized) at least one resource group is started on one or more available zones to make at least one resource available to clients (e.g., client devices 102, 103 over network 120). Similarly, following a failure that that takes a resource group offline (i.e., the resource group is no longer running on the zone), at least one resource group may be started on one or more available zones to make at least one resource available to clients (e.g., client devices 102, 103 over network 120).

Figure 1B:
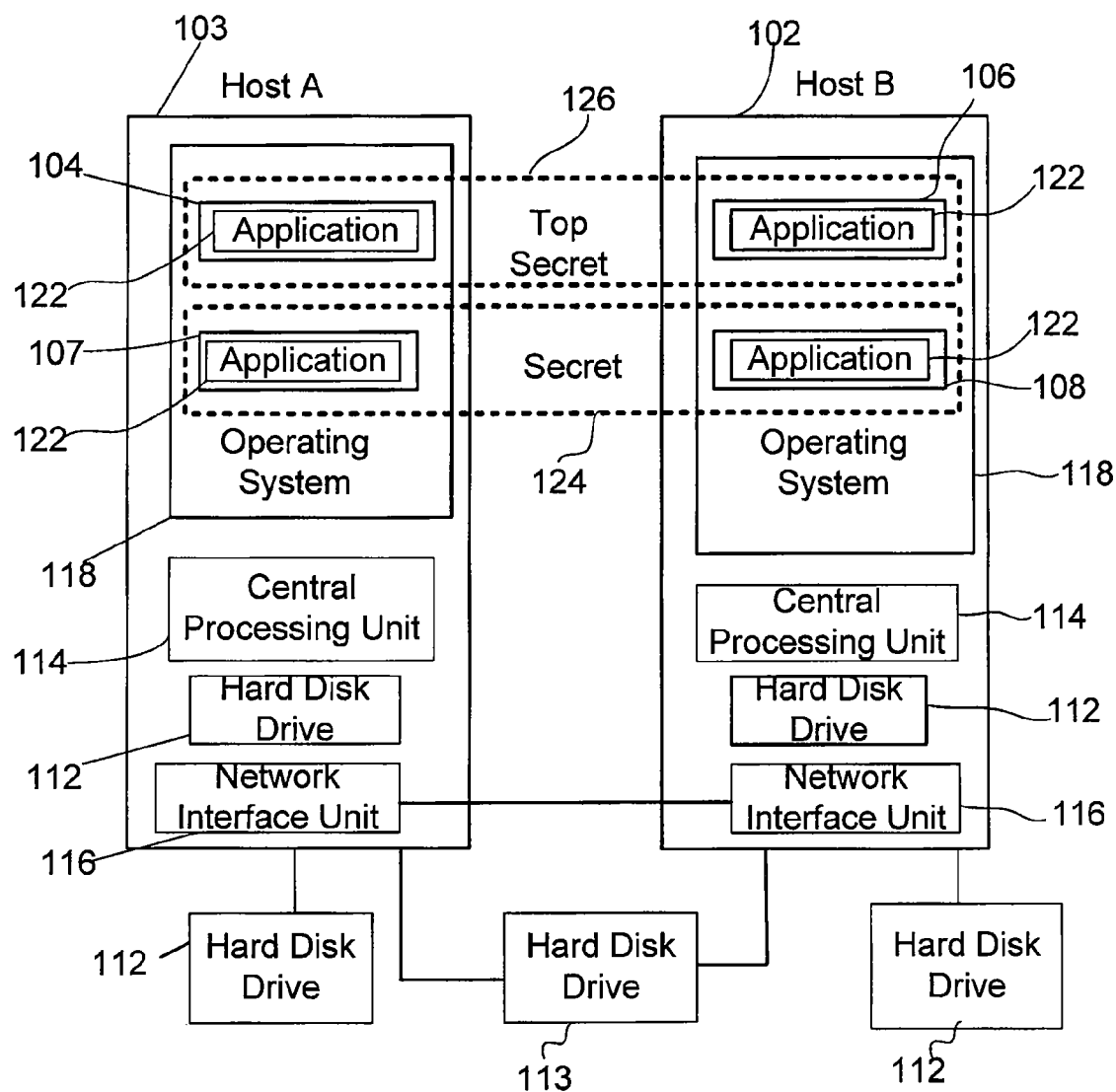

FIG. 1B illustrates in greater detail a block diagram of two machines 102, 103 hosting multiple zones 104, 106, 107 and 108. Each machine may act as a server and each machine hosts an operating system 118, the operating system 118 provides multiple operating environments containing zones 104, 106, 107 and 108. Each machine 102 and 103 may include disk storage 112, such as a hard disk drive. The disk storage 112 may be located physically within the machine 102, 103 or may be located outside the machine 102, 103 and connected via a network or other type of connection. Similarly, the machines 102, 103 may share a hard disk drive storage 113. The machines 102, 103, may also include a central processing unit 114 and a network interface unit 116 connected to a network 120. The network interface 116 may connect machine 102 to machine 103 (as well as to any other machines) as well as provide connections to machines in other clusters, as well as other types of network communications.

FIG. 1B also illustrates two cluster-wide security containers 124 and 126. The cluster-wide security containers each have a separate security label, container 124 has the security label "secret" whereas container 126 has the security label "top secret." A file system with a security label of "secret" identifies the data as being "secret." In another embodiment, data may include a security level as well as a compartment and the two pieces may be combined to create one security label. For example, a piece of data may be marked "top secret" with a compartment of "navy." While another piece of data may be marked "top secret" with a compartment of "army." The security labels for each piece of data encompass both the level and the compartment, therefore the access rights will be different for each piece of data, although both have the same security level (i.e. top secret). When a security label is applied to an active entity, such as an application, the security label identifies the kind of data from a security perspective, that the active entity may process. In these embodiments, the security label is stored at a security container, and everything inside the security container inherits the security label of the security container. The security containers 124, 126 may provide high availability of resources and data to each zone 104, 106, 107 and 108, while maintaining security. The zones 104, 106, 107 and 108 host a number of applications 122, as well as data and/or other resources (not shown).

Figure 2:
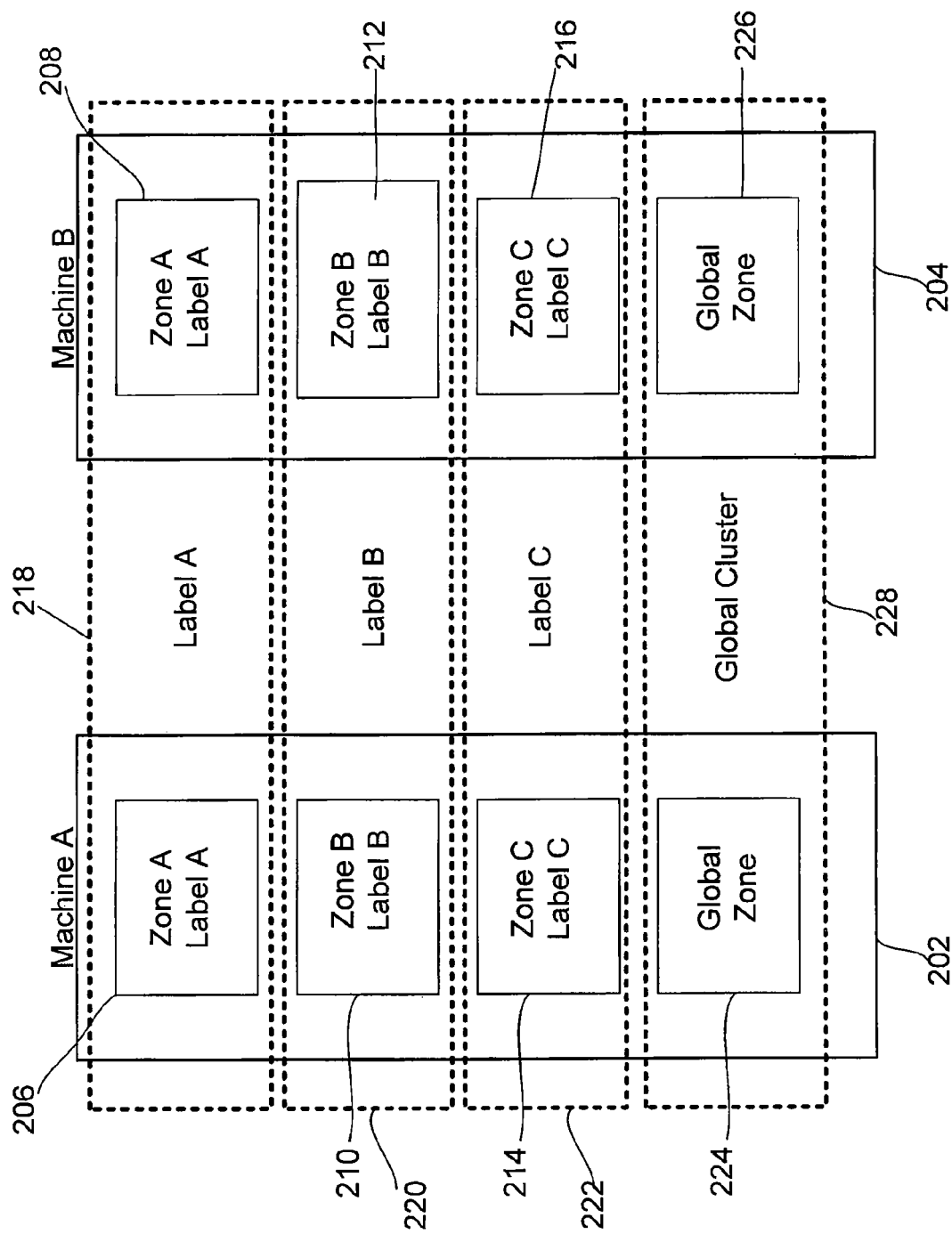
FIG. 2 illustrates an example of a two-machine physical cluster hosting three security containers and a global cluster.

FIG. 2 illustrates an example of a two-machine physical cluster hosting three cluster-wide security containers and a global cluster according to some embodiments. The block diagram illustrates three cluster-wide security containers with multiple zones as well as a global cluster hosting two global zones. As shown, the machines 202 and 204 may contain a set of non-global zones 206, 208, 210, 212, 214, and 216; and the zones may combine to form zone clusters which provide the cluster-wide security containers 218, 220 and 222. The global zones 224 and 226 combine to form a global cluster 228, which is also a cluster-wide security container. The zone clusters and the global cluster can all be considered a form of a virtual cluster. The first machine 202 may contain Zone A 206 with security label A, Zone B 210 with security label B, Zone C 214 with security label C and a global zone 224 with the trusted computing base. The second machine 204 may contain Zone A 208 with security label A, Zone B 212 with security label B, Zone C 216 with security label C and a global zone 226 containing the trusted computing base.

The security labels, Label A, Label B, Label C may be ranked in terms of security level, by the trusted computing base, in order to determine access to resources. For example, Label A may be "classified," Label B may be "top secret" and Label C may be "need to know." In this case, Label A may be ranked lower than Label B, and Label B may be ranked lower than Label C. However, the security labels may be ranked in any type of order or in some embodiments may not be ranked. Additionally, the global cluster 228 may include a security label. The security label for the global cluster 228 may be different than the other security labels, in that the global cluster 228 security label may be set to a special value, which may be higher than the other security labels. For example, Labels A, B and C will have a lower access level than the global cluster 228. The software in the trusted computing base may operate at any security label level. As the global cluster 228 has a higher security label than the other cluster-wide security containers 218, 220, and 222, the trusted computing base may manage the other cluster-wide security containers 218, 220, and 222. See the discuss with regard to FIG. 5, for more detail regarding the trusted computing base. The trusted computing base may choose to operate at the lowest security label, making it possible to pass information from the global cluster 228 to the other cluster-wide security containers 218, 220, and 222. In other embodiments, information may not flow from a higher security label to a lower security label.

The zones 206, 208, 210, 212, 214, 216, 224 and 226 may be linked to form virtual clusters, as discussed with regard to FIGS. 1A and 1B. Additionally, the zones 206, 208, 210, 212, 214, 216, 224 and 226 in each virtual cluster may be contained within a security container, such as the security containers 218, 220 and 222. The first cluster-wide security container 218 has the security label A, the second cluster-wide security container 220 has the security label B, the third cluster-wide security container 222 has the security label C and the final cluster-wide security container is the global cluster 228. The zones 206, 208, 210, 212, 214, 216, 224 and 226 and all the resources located within each zone inherit the security label of the containing security container. This feature tags each piece of data within a zone with the security label, without each piece having to be tagged individually. Although three security containers and a single global cluster have been illustrated, there may be any number of cluster-wide security containers or clusters.

As shown, the virtual cluster security container 218 may contain Zone A 206 on the first machine 202 and Zone A 208 on the second machine 204. In this configuration, some resources (such as applications), hosted in Zone A 208 may move between the first machine 202 and the second machine 204, but remain within the cluster-wide security container 218.

The cluster-wide security container implemented as a virtual cluster provides two major advantages. The first advantage is availability. If machine 202 or 204 fails or a zone on a machine 202 or 204 fails, applications may be moved to the other machine. For example, an application may be moved from machine 202 to machine 204 in the event that the application fails on machine 202. This means that the system can recover from failures quickly. The second advantage is scalability. Some applications may support multiple instances of the application running concurrently on multiple machines. This approach enables the application to use the resources of multiple machines. For example, an application may run concurrently on machine 202 and machine 204, allowing the computing power, storage availability, etc. of both machines 202 and 204 to be used by the application. This concurrent ability means that if a machine or zone fails, the application may not be interrupted as it is already running on another machine.

However, if a failure does occur, the membership system detects the failure and updates membership information. The membership is determined by the number of zones up and running. The system then may select a new zone to host the application. Some applications require storage and network communications. The membership system is discussed in more detail with regard to FIG. 5.

Depending on the embodiment, there may be relationships between resources or resource groups. One type of relationship may be a dependency, in which actions of one resource are dependent on the actions of another resource. For example, in one variety, the system may be instructed to start up resource A after resource B starts up, and to stop resource A should resource B stop. Another example, may be that resource A may start after resource B, but resource A may not stop when resource B stops. The dependency may be between resources in the same resource group or between resources in different resource groups. Additionally, a single resource may be involved in multiple dependencies. There may be multiple varieties of dependencies, and the above examples are merely illustrations of two types of dependencies. Another kind of relationship between resource groups may be an affinity. An affinity, which may be a binary relationship between a pair of resource groups, specifies a location relationship between resource groups, and there may be multiple varieties of affinities. As with dependencies, a single resource group may be involved in multiple affinities. For example, a positive affinity may request the system to place two resource groups on the same machine, while a negative affinity may request that the system place two resource groups on different machines. Specifically, when two resource groups belong to different security containers and have a positive affinity relationship, the resource groups may be placed on the same machine, but in zones of the security container that owns that resource group. It should be noted that there are many variations possible within dependencies and affinities, and other types of resource relationships are possible as well. Relationships may be used to determine resource placement and location when providing high availability.

Referring again to FIG. 2, for example, an application may be dependent upon a file system mounted on a particular storage device, and the application also may depend on a particular network address. If the application fails in zone 206, the cluster security container 218 (i.e. zones 206 and 208) imports the storage device on a new zone, mounts the file system on the new machine 204, "plumbs" the particular network address (i.e. makes the network address usable) in the new zone 208, and finally launches the application. Additionally, in these embodiments, if there are any affinity relationships, the cluster 218 may use those relationships and information to help select the new zone. It should be noted, however, that the system does not share data between the different cluster-wide security containers. This feature prevents data having different security labels from being mixed together or leaked into a security container having a different security label. However, if the sharing of data does not impact security, some sharing is allowed. For example, executable files for a common utility may be shared between multiple security containers in read/execute mode. This feature is discussed more with regard to FIGS. 8 and 9.

Likewise, the security label 220 may contain Zone B 210 on the first machine and Zone B 212 on the second machine 204, and resources may move between Zone B 210 on the first machine 202 and Zone B 212 on the second machine 204, but remain contained within the security container 220. Similarly, the virtual cluster security container 222 may contain Zone C 214 on the first machine 202 and Zone C 216 on the second machine 204 and resources may move between Zone C 214 on the first machine 202 and Zone C 216 on the second machine 204.

In some embodiments, each security container 218, 220 and 222 may be a virtual cluster having its own membership. The virtual cluster may use CPU's that are dedicated for its use or may share CPU's with other clusters. The operating system ensures that information in a CPU is not shared among clusters The cluster-wide security containers 218, 220 and 222 have separate cluster applications and resources. Each of the security containers 218, 220 and 222 is configured to include data and resources that have the same security label as the security container 218, 220 or 222. For example, a resource present in security container 218 may have the security label A, a resource present in security container 220 may have the security label B, etc. Each resource has its own security label, which it inherits from the security label of the enclosing cluster-wide security container. Applications within security container 218 may only see and modify resources within the security container 218, although there may be other resources, such as applications and data stored within the first machine 202.

The global cluster 228 contains the global zones 224 and 226. The global zones 224 and 226 may host components of the trusted computing base. The global cluster 228 communicates with each security container and performs security checks for each application and resource attempting to gain access to various data stored on the machines 202, 204. The global zone will be described in greater detail with regard to FIG. 5 below.

Figure 3:
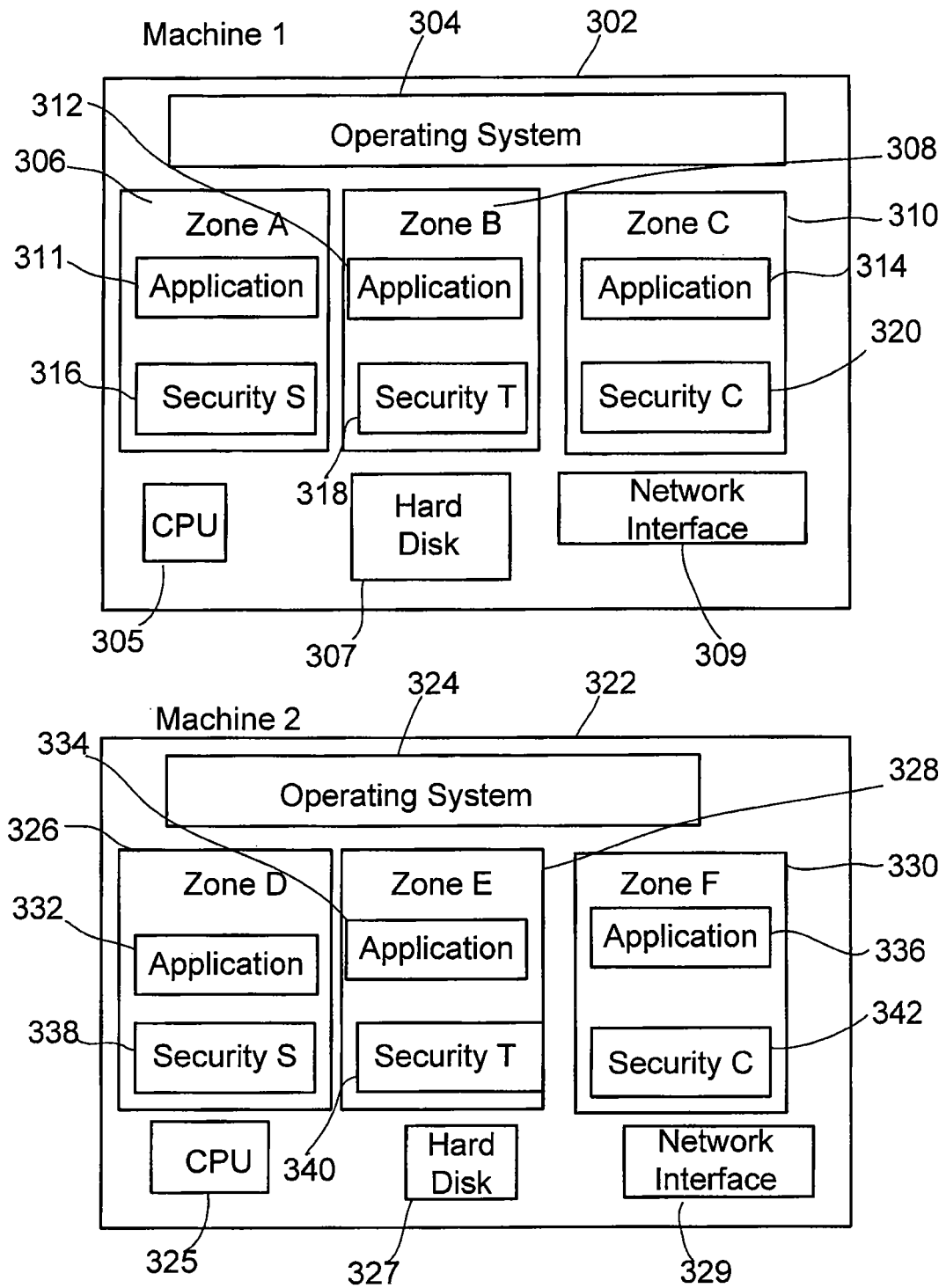
FIG. 3 is a block diagram illustrating the two machines of FIG. 2.

FIG. 3 is a block diagram illustrating two machines 302, 322 implemented with a hardware platform and an operating system. In some embodiments, the machines 302, 322 may be the machines 202, 204 shown in FIG. 2. Referring now to FIG. 3, a machine 302 may be implemented with an operating system 304, a CPU 305, a hard disk 307, a network interface 309, and multiple zones 306, 308 and 310. Machine 322 may be similarly configured, and include an operating system 324, a hard disk 327, a network interface 329, and three zones 326, 328 and 330. Each zone 306, 308, 310, 326, 328 and 330 may include a number of resources, for instance applications 311, 312, 314, 332, 334 and 336 and each zone may have a security label 316, 318, 320, 338, 340 and 342. As discussed above with respect to FIG. 2, each zone may communicate with other zones having the same security label. Zone A 306 on machine 302 may share resources and data with Zone D 326 located on machine 322, as both Zone A 306 and Zone D 326 have the same security label "S" 316 and 338. Similarly, Zone B 308 on machine 302 may share resources with Zone E 328 on machine 322 as both Zone B 308 and Zone E 328 have the security label "T" 318, 340. Finally, Zone C 310 on machine 302 may share resources with Zone F 330 on machine 322 as both have the same security label "C" 320 and 342. Furthermore, in some embodiments, zones on the same machine may share resources, for example, if Zone B 308 were to have the same security label as Zone A 306, Zone B 308 and Zone A 306 may be able to share resources.

Figure 4:
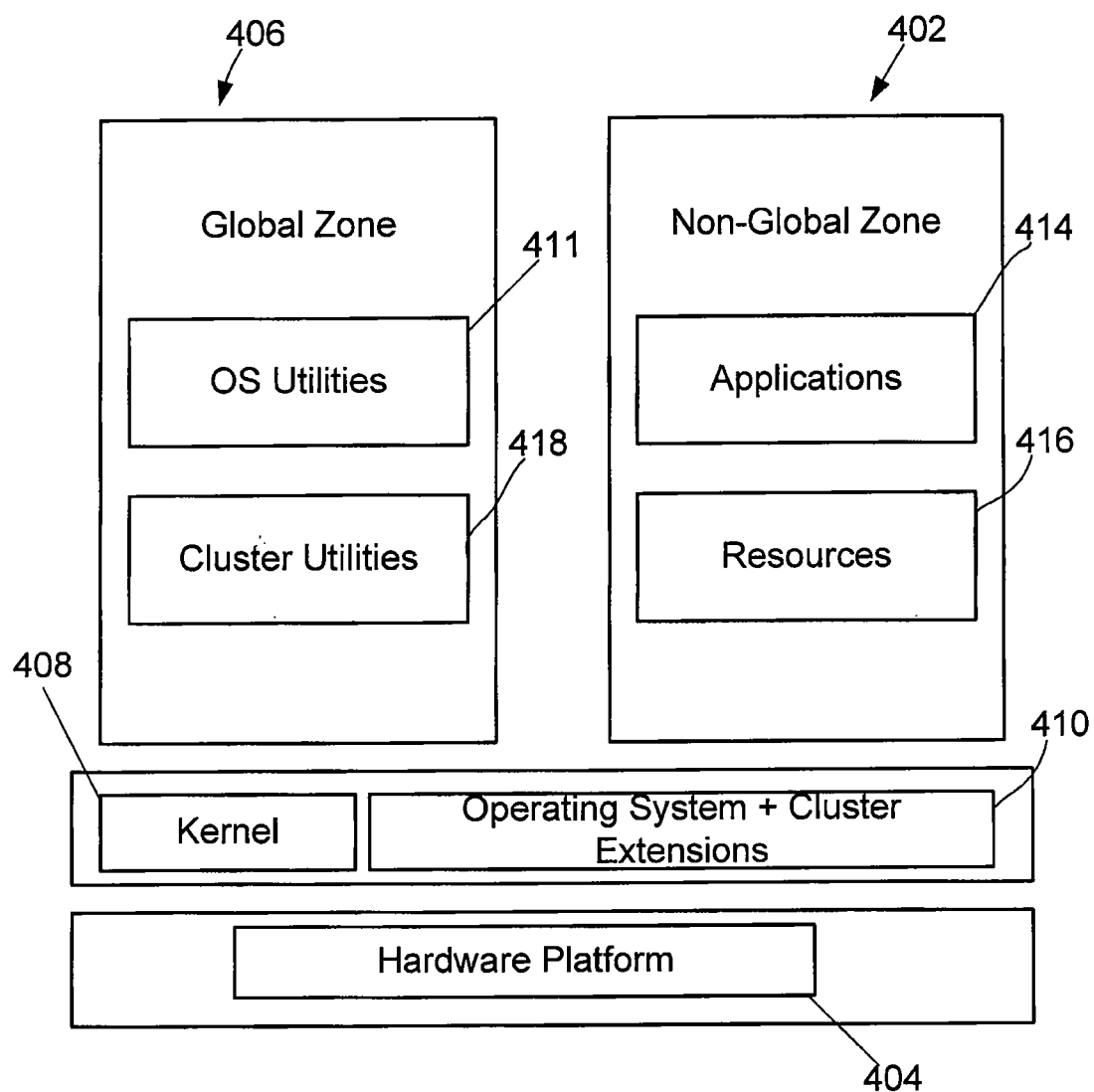
FIG. 4 is a block diagram illustrating a hierarchical relationship between a virtual zone and the hardware platform.

FIG. 4 is a block diagram illustrating a hierarchical relationship between a zone and the hardware platform, such as those illustrated in FIG. 3. A zone, 402 and 406 is an operating environment provided by the operating system 410 in which user level software components run. The operating system runs in the kernel and interacts with the kernel and global zone software components to enforce security checks. Referring now to FIG. 4, the hardware platform 404 may support a zone 402, a global zone 406, a kernel 408, an operating system 410. The hardware platform 404 may be any type of computing device capable of connecting to another computing device to send and receive information (as discussed above with respect to client devices illustrated in FIGS. 1A and 1B). The hardware platform 404 may include a server, a personal computer, or other type of computing system. A more detailed discussion of the hardware platform 404 is presented below with regard to FIG. 10. The operating system 410 performs security checks on requests to access resources 416 from applications 414 within the zone 402. The operating system 410 may have cluster extensions and provide the zone 402. The zone 402 may contain a group of resources 416 and an application 414.

The global zone 406 implements security checks and hosts data. The global zone 406 is configured to be implemented on one machine, but has access to all other zones. The global zone 406 hosts operating system utilities 411 and cluster utilities 418. In some embodiments, only trusted applications run in the global zone 406, preventing an untested or untrusted application from modifying information in the global zone 406. This may be accomplished because all applications running outside of the global zone 406 may be treated as untrusted, therefore an application does not need to be tested to determine whether it actually works correctly or whether it has any security flaws before being used within a specific security container.

The global zone 406 may perform security checks with the help of the kernel 408. The security checks performed in the global zone 406 are tamper-proof. This is because the checks are done in the kernel 408 and requests from applications may go through the kernel 408 before being processed by the global zone 406 (see the discussion with regard to FIG. 6 for a more detailed description of how an application may access data stored on the machines via the global zone 406). Also, there may be security checks performed within each zone, but they are not as secure as the checks performed within the global zone 406. This is because it is possible for a person or application to write software or put software inside a security container that may disable the security checks performed within the specific zone or within the security container.

As shown, the kernel 408 may act as a bridge between applications within the zone 402 and the global zone 406, and may manage the resources 416, as authorized by the global zone 406. For example, the kernel 408 may establish and store the configuration membership data of each security container, such as which zones belong to which security container. This may allow the kernel 408 to perform security checks using the security container identification of the originating zone. Based on the origin of the request the kernel 408 may decide whether or not to fulfill the query. In some embodiments, processes in a security container may obtain membership information for their security container only, whereas processes running inside the global zone 406 may obtain membership information of the global cluster as well as any security container.

In some embodiments, MLS is desired. In these embodiments, the operating system 410 supports MLS for a single machine. For example, the operating system 410 may be SOLARIS TRUSTED EXTENSIONS OR RED HAT ENTERPRISE LINUX 5 (incorporating SECURITY ENHANCED LINUX). In other embodiments, the strongest level of security may not be desired. In such embodiments, the operating system 410 may be any general purpose operating system, such as UNIX, LINUX, WINDOWS, or the like. In even other embodiments, the operating system 410 may also be a special purpose operating system designed for particular functionality. Cluster extensions may be provided as part of the operating system 410. Cluster extensions provide the operating environment for the zone 402.

Figure 5:
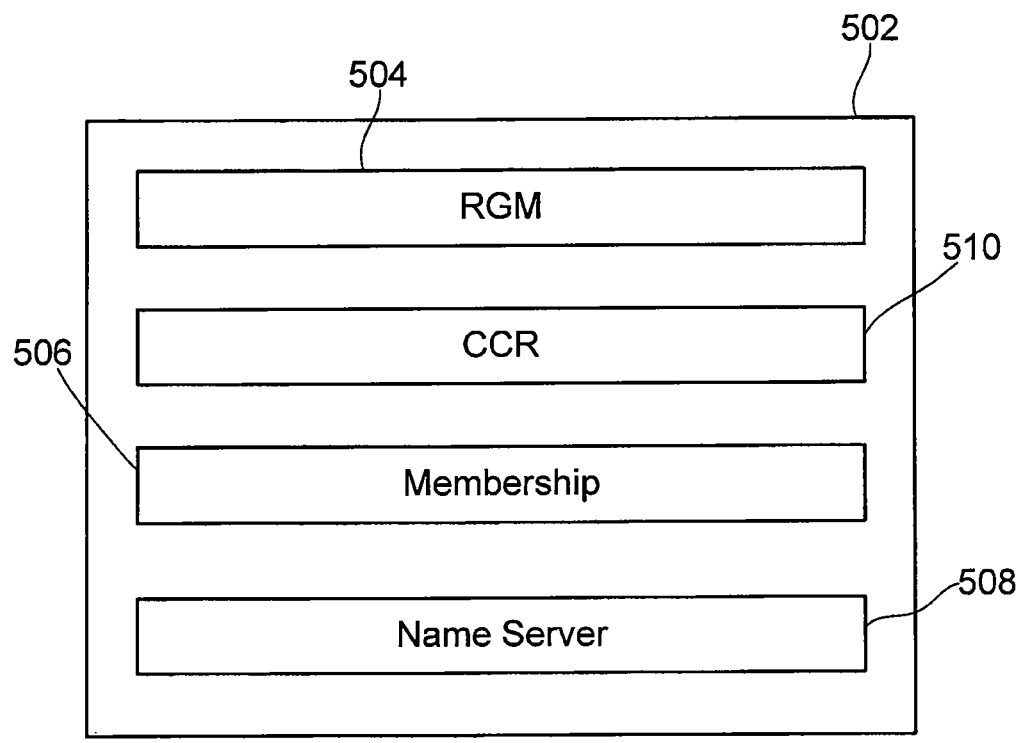
FIG. 5 is a block diagram of the trusted computing base.

FIG. 5 is a block diagram illustrating a lower level view of the trusted computing base, which includes subsystems that are relevant to security. The trusted computing base 502 may run in the global zone, the kernel, or have components that run in both the kernel and the global zone. The trusted computing base 502 may run software that allocates resources and performs other zone-resource management. Referring now to FIG. 5, the trusted computing base 502 may include a resource group manager (RGM) 504, a cluster configuration repository (CCR) 510, a membership 506 and a name server 508.

The CCR 510 may store information about the various clusters, such as configuration information about each cluster in the system. Additionally, the CCR 510 may store information regarding the information that each zone may access. For example, the CCR 510 may have information identifying specific file systems or devices that may be accessed by zones. The CCR 510 may also identify what network communications each resource may use and the machines that host each zone. Furthermore, the CCR 510 may control which CPUs a zone may use and how much memory each zone may use. The CCR 510 may also provide information regarding the subnet and internet protocol (IP) addresses that may be used in order for the zones to communicate between other zones. The CCR 510 is divided into different locations for different security containers. The CCR 510 subsystem may maintain a local copy of the configuration information for the global cluster and the zone clusters on each machine belonging to the cluster. The configuration information for each cluster may be placed in a separate location in multiple files on the root file system of the global zone 406.

In some embodiments, the CCR 510 data may not be accessed and may not be visible directly as files to the processes running inside cluster-wide security containers 218, 220, 222 In some embodiments, the global zone 406 processes and the kernel 408 modules may read/write CCR 510 files directly, while other applications are prevented from doing so. The CCR 510 subsystem may provide a programming interface to read/write CCR 510 data. The CCR 510 subsystem performs appropriate validation checks so that a cluster-wide security container may access only its own information. Additionally, a security container such as 218, 220, 222 may not alter the security configuration data. The security related information may be managed by the trusted computing base 502, which may be designed to read/write CCR 510 data for the global cluster as well as any cluster-wide security container.

The resource group manager (RGM) 504 may manage resource control and provide a programming interface providing applications information about applications, resources and their relationships. To this end, the RGM 504 may record information that identifies the applications and resources along with their dependency and location relationships as stored in the CCR 510. The RGM 504 may include components both inside and outside of the trusted computing base 502. The global zone 406 and security containers 218, 220 and 222 are viewed as separate domains by the RGM 504. The RGM 504 components within the trusted computing base 502 perform security checks for communications with RGM 418 components, which are part of the cluster utilities, outside the trusted computing base 502. For example, the RGM 504 may check whether the requestor has the permission to create a dependency between two resources. The RGM 504 may include separate daemons for each cluster, and each daemon may access data in different locations of the CCR 510. There may be communication between the daemons. In this manner RGM 504 prevents commingling of information and applications belonging to each cluster/security container. This helps to insure that if an application fails, it will do so in a safe manner. This is because the RGM 504 will not start/stop applications in different security containers.

In addition, the RGM 504 may also have information regarding general management. For instance, when the RGM 504 prepares a network address for use by an application, the RGM 504 checks whether the cluster-wide security container has permission to use that network address. In some embodiments, dependency relationships between applications and resources may be set as well as location relationships between applications and resources.

The trusted computing base 502 may also contain a name server 508. The name server 508 may run in the kernel 408. The name server 508 allows cluster components to connect to each other dynamically. For instance, the name server 508 provides a separate name space for each cluster-wide security container 218, 220, 222 and the global cluster 228. Each name space may be an in-memory repository of references to software components and their names. The name server 508 performs security checks on requests that it receives. The global zone 406 as well as the kernel 408 may access the name spaces. There may be separate name spaces for zone clusters 218, 220, and 222, as well as a separate name space for the global cluster 228. The global cluster can access both its own name space and that of all other clusters. In some embodiments, the zone clusters 218, 220, and 222 cannot access the name space of any other cluster. Additionally, in some embodiments, each cluster 218, 220 and 222 may access its own name space.

The system may also create an audit trail using elements in the kernel 408, the global zone 406 and the trusted computing base 502. For example, information about the commands that are issued may be stored in the root system file. In some embodiments, the audit trail makes it possible to identify the subject requesting the operation, the object to be accessed, the operation performed, as well as the security labels associated with the subject and the object. Additionally, other information may be recorded as well. In these embodiments, the audit trail may not be modified by processes outside of the trusted computing base 502, insuring that records are not modified or destroyed. However, in other embodiments, such as lower level security systems, the system may include less information stored in the audit trails, or may not provide an audit trail feature.

Figure 6:
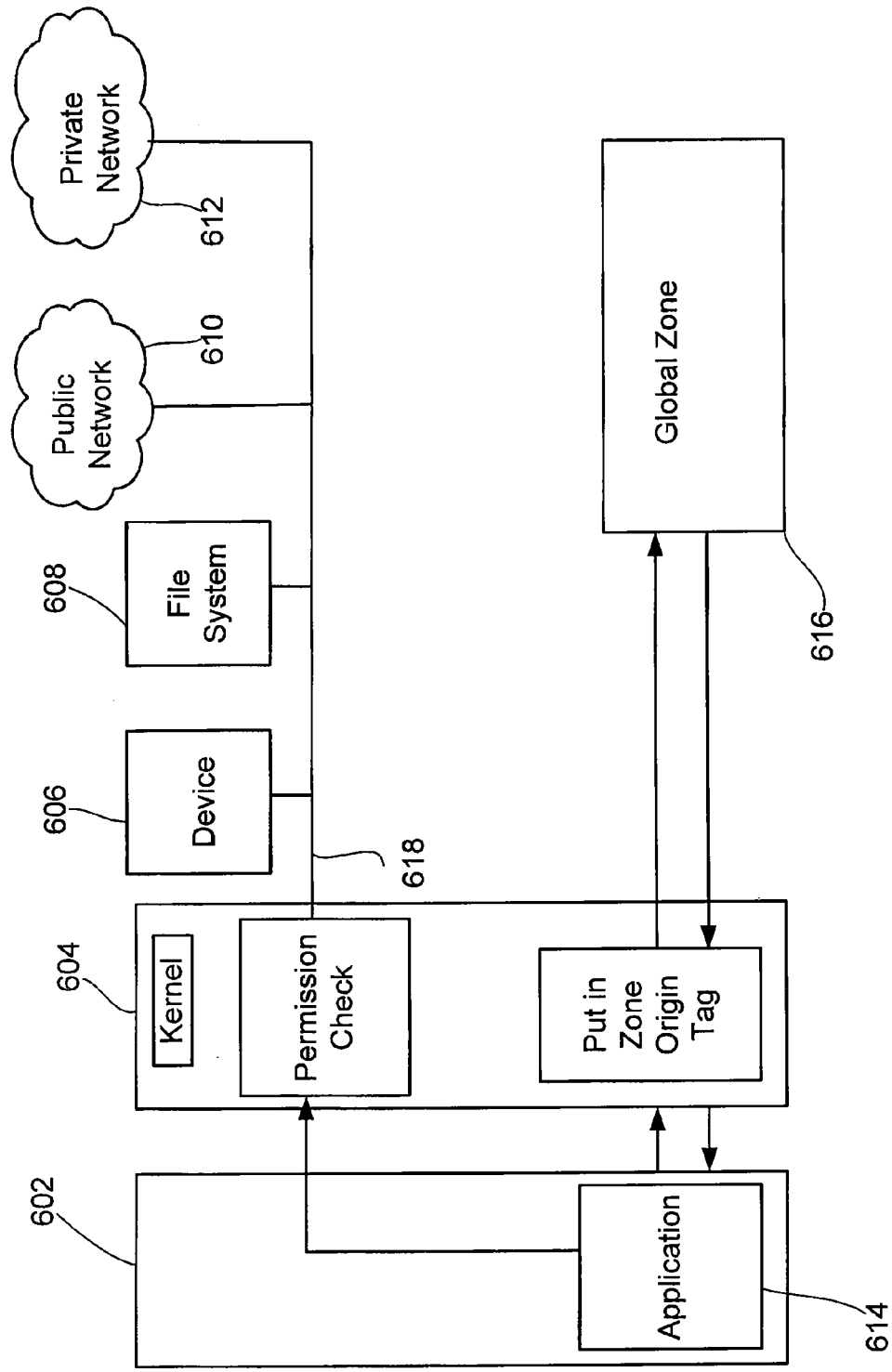
FIG. 6 is a flow chart illustrating a security check process for zones.

FIG. 6 is a block diagram illustrating a security checking process performed by the global cluster 228 illustrated in FIG. 2 and the global zone 616. The kernel 604 provides ownership-based Discretionary Access Control (DAC) policies, as well as even stronger security controls by enforcing label-based Mandatory Access Control (MAC) policies. DAC may protect file/directory resources using UNIX permission bits and access control lists. MAC is enforced by the software built into the kernel 604, thereby providing security to data stored on storage devices on a particular machine. Processes running inside a zone 602 may interact with the global zone 616 via system calls and door calls. For example, there may be a communication path 618 between a zone 602, a kernel 604, a device 606, a file system 608, a public network 610, a private network 612, and/or a global zone 616. Each cluster-wide security container 602 has a unique identifier, allowing the system to recognize which zones belong to which security containers. This means that when requests are shipped to another machine (such as those machines hosting the global zone 616), the request may be associated with information identifying the cluster-wide security container that the request originated from.

Referring now to FIGS. 4 and 6, the zone 602 may contain an application 614 capable of making a request to receive data from the global zone 616. The request may be, for example, a file open for write operation. For these types of requests, the operating system 410 uses a system call. With a system call, the kernel 604 may determine the location information of the requestor and security label and then add an origin tag to the data. For example, a system call may be implemented by a trap instruction. The trap is a specific instruction code in a machine instruction set that when executing the trap, it will go from a user land process into the kernel 604. For example, if an application 614 needs a service from the operating system 410 (such as file open with write permission), the application 614 issues an instruction which the hardware 404 realizes cannot be processed in a certain domain. The hardware 404 then transfers control to the operating system 410, the operating system 410 uses a look up table to determine which subsystem should handle the request. The kernel 604 adds identifying information to the request, such that the operating system 410 knows where the request came from (i.e. the security label of the request) and pulls information containing the same security label for the application 614. A security check is performed either in the kernel 604 or the global zone 616, depending upon the type of request, prior to granting access to the requested service. Additionally, the security checks may be done on any kernel or any global zone located on any machine within the system. For example, a request may come from the zone 602 and the kernel 604 of the machine hosting the zone 602 adds the identifying information. Once the identifier has been added, the request may fulfilled and verified for security purposes, on any other machine's kernel or any global zone within the system.

In some embodiments, the system may use a door call as a mechanism by which the application 614 requests a cluster service, however, other mechanisms may be used. A door call is local with respect to a single machine. An application 614 may use a door call to make a request to the global zone 616 or the kernel 604. The kernel 604 determines which zone 602 the request was made from and tag the data with the additional location information accordingly. The kernel 604 then may proceed to forward the request to a software component in the operating system 410 or the global zone 616. The global zone 616 or kernel 604 performs a security check on the request using the location data to verify the access level. Part of the door call contains an address of what the operating system 410 should execute and whether the destination of the request is the kernel 604 or the global zone 616. These communication mechanisms (door calls and system calls) allow applications that have not been tested or checked for flaws, bugs, etc. to be used in security containers without risking security breaches or data leakage.

The application 614 may be any type of application, and may be divided into two categories: failover applications and scalable applications. If the application is a failover application, one instance of the application runs on one zone at a time. If the machine hosting the application 614 fails, the cluster may automatically restart the application 614 on another zone. Failover applications may move between zones for reasons of load balancing, hardware maintenance, or the whims of the administrator. If the application is scalable, different instances of the application may be run simultaneously on different zones of the cluster. Safely consolidating cluster applications keeps these applications separate, while respecting the fact that these applications are spread across multiple machines and these applications may dynamically move between machines.

The file system 608 may be any type of file system. In some embodiments, file systems are accessed with both read and write permission are given exclusively to one security container. However, the administrator may assign read only file systems to the different security containers as long as the file system has a label appropriate to be accessible to multiple security containers. Such file systems (located in multiple security containers) usually host application binaries, which may be files containing executable code.

The global zone 616 sets a security label for a file system 608. The file system 608 may be any type of file system, for instance, a failover file system, cluster file system, and the file system may be accessed read-only or read-write. However, before the file system 608 is accessed, a security check is done by either the kernel 604 or the global zone 616. The security check verifies that the file system 608 is authorized to be accessed by the zone 602. If the file system 608 is not authorized, the file system 608 is not accessed by the zone 602. If the file system 608 may be accessed by the particular zone, then access to file system 608 is allowed. If the file system 608 is a cluster-file system, it may be mounted on multiple machines at the same time. In these embodiments, the global zone 616 or kernel 604 verifies whether the file system 608 may be accessed by the specific different zones, and if so then the file system 608 may be mounted on each zone.

The storage device 606 may be any type of device for storing data, such as a hard-drive, flash memory and the like. In some embodiments, the storage device 606 may be located in a particular machine, or may be located within a cluster, allowing multiple machines to access the storage device 606. For example, when each cluster and/or zone is configured, storage devices 606 that the zone 602 may access are determined. If the zone 602 wishes to access the storage device 606, zone 602 places a system call, and the global zone 616 or kernel 604 checks to determine whether the storage device 606 is accessible from the particular zone 602. The kernel 604 receives the request first, tags the request with the security label and originating data, and the global zone 616 or kernel 604 performs this check based on the identification data. If the zone 602 has access to the data in the storage device 606, the kernel 604 processes the request.

The public network 610 may provide communication to end points outside of the cluster. The public network 610 may be any type of network as discussed above with respect to FIG. 1A. The trusted computing base 502 may specify whether a communication path may be used for one security label or multiple security labels. If the communication path may be used for multiple security labels, the data carries information identifying the security label. One embodiment uses a Commercial Internet Protocol Security Option (CIPSO) header that identifies the security label for that piece of information. Additionally, in one embodiment, there are mechanisms in the communication path 618 to ensure that information only reaches the security container with the same security label.

The private network 612 may provide communications between other zones. For example, in one embodiment each security container 218, 220 and 222 may have its own subnet. IP addresses may be moved between machines 202, 204. Before an IP address may be moved, the kernel 604 or the global zone 616 verifies that the IP address is authorized to be used within a particular zone. The destinations for the forwarding information received on the IP address to be used within a particular zone, resides within the same security container.

Figure 7:
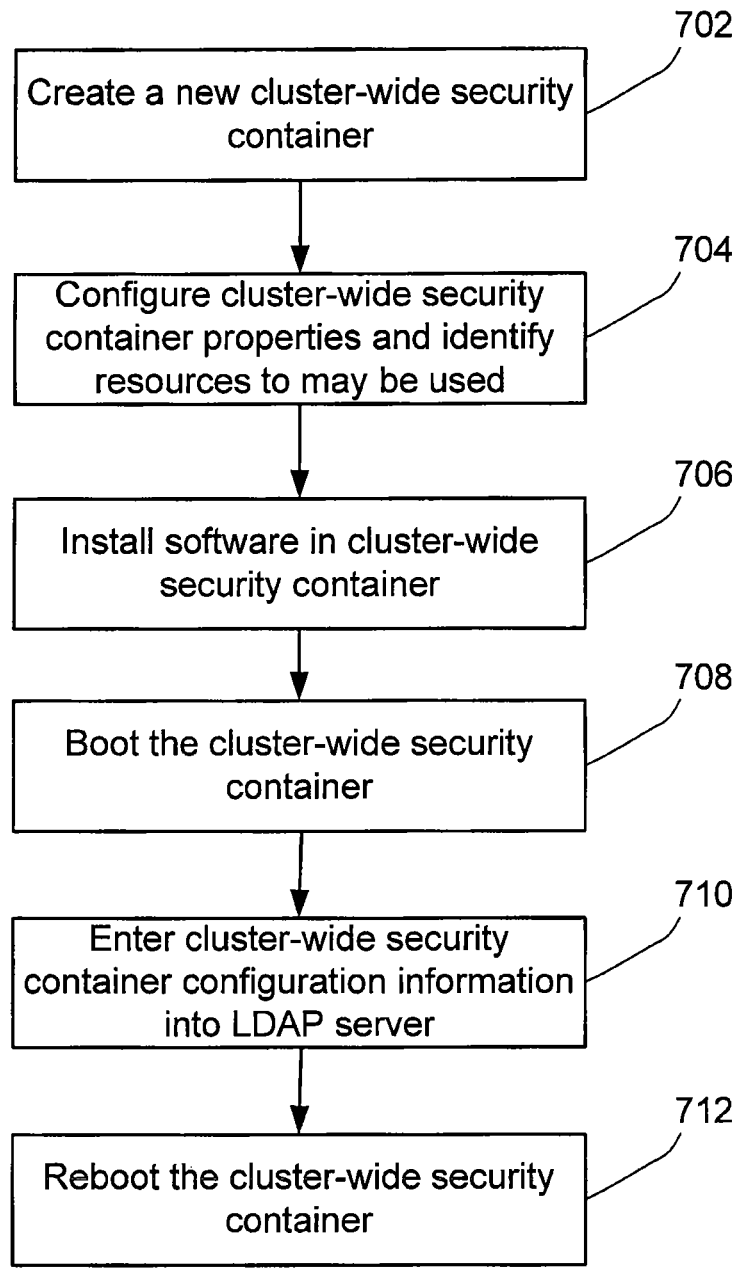
FIG. 7 is a flow chart illustrating an embodiment of security container installation.

FIG. 7 is a flow chart illustrating some embodiments of cluster-wide security container configuration. The configuration may be used to establish the security containers, security labels and other settings. A security container may be configured in a variety of arrangements. Referring now to FIG. 7, the first operation 702 creates a cluster-wide security container using the tool command clzonecluster. The tool clzonecluster is part of the trusted computing base 502. The creation of the security container includes the creation of the zones that may reside within the security container. Operation 704 identifies the resources, such as file systems, network resources, and storage devices that may be accessed by the security container. Operation 704 allows a user via the clzonecluster tool to additionally configure properties of the security container. For example, a user may set the resource control properties to specify resource controls for memory, CPUs, etc. Operation 706 installs the software into the security container using the clzonecluster tool. Operation 708 boots the security container. In one embodiment, a lightweight directory access protocol server (LDAP) server stores security label information about machines, zones, and network communication paths. Operation 710 the user enters the security information about machines, zones, and network communications for the security container that was configured into the LDAP server. Operation 712 the security container is rebooted. After operation 712, the security container is ready to be used. However, it should noted that variations to the configuration process are possible, and this is simply an illustration.

Figure 8:
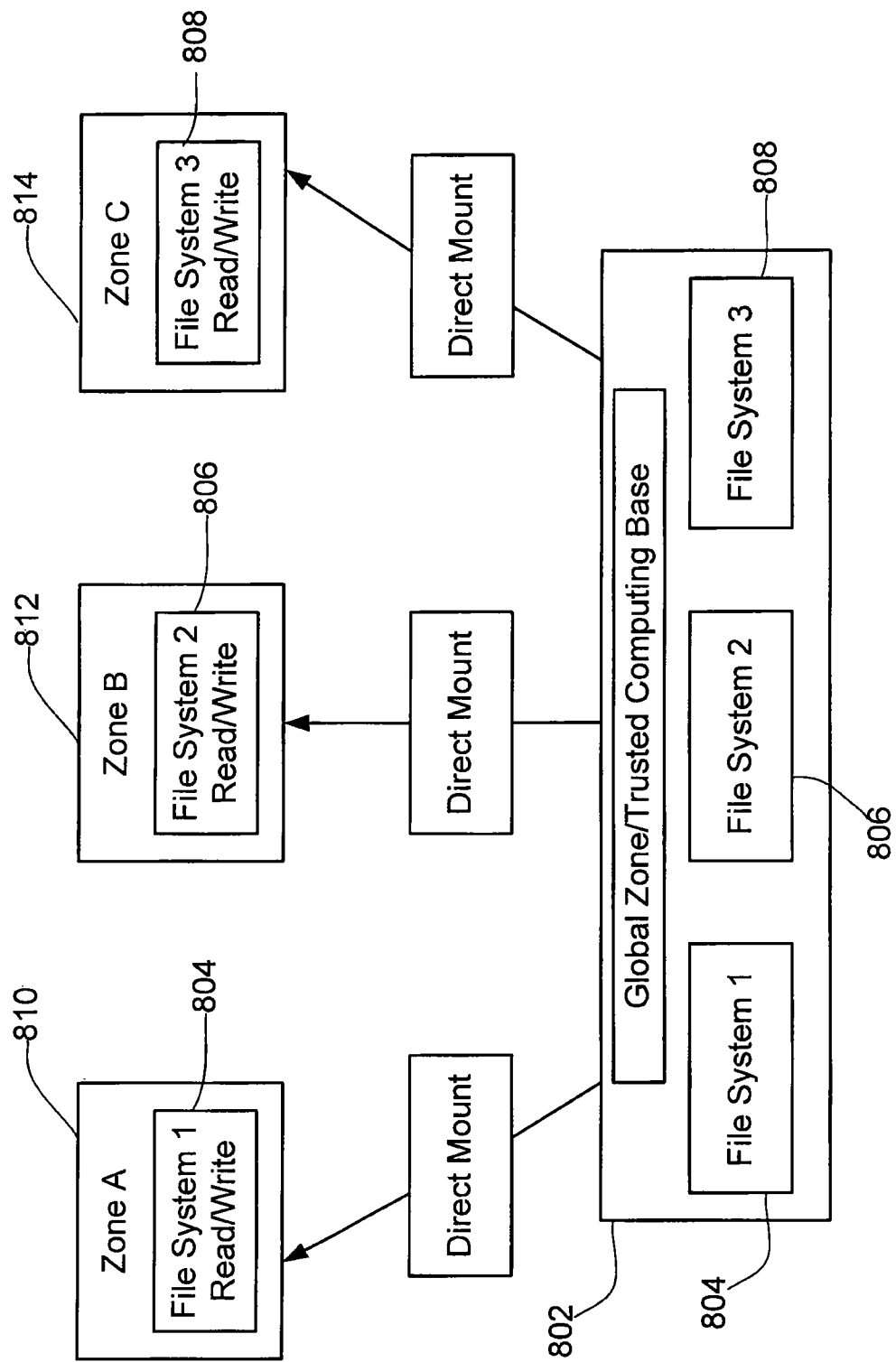
FIGS. 8 and 9 are block diagrams illustrating different embodiments of file installation to zones.

FIG. 8 is a block diagram illustrating the granting of read/write access right for file systems to zones according to some embodiments. Referring now to FIG. 8, for data file systems that may include more than just binaries for operating software, or more sensitive data, a direct mount is used to load the file system into a number of zones. The global zone 802 may contain three file systems 804, 806, 808 that may be mounted into each zone 810, 812 and 814. The file systems 804, 806 and 808 are mounted under the root of the container of each zone 810, 812 and 814. As a result, this may prevent the file system from being accessed elsewhere and restricts users from sharing the information to users with different security labels.

Figure 9:
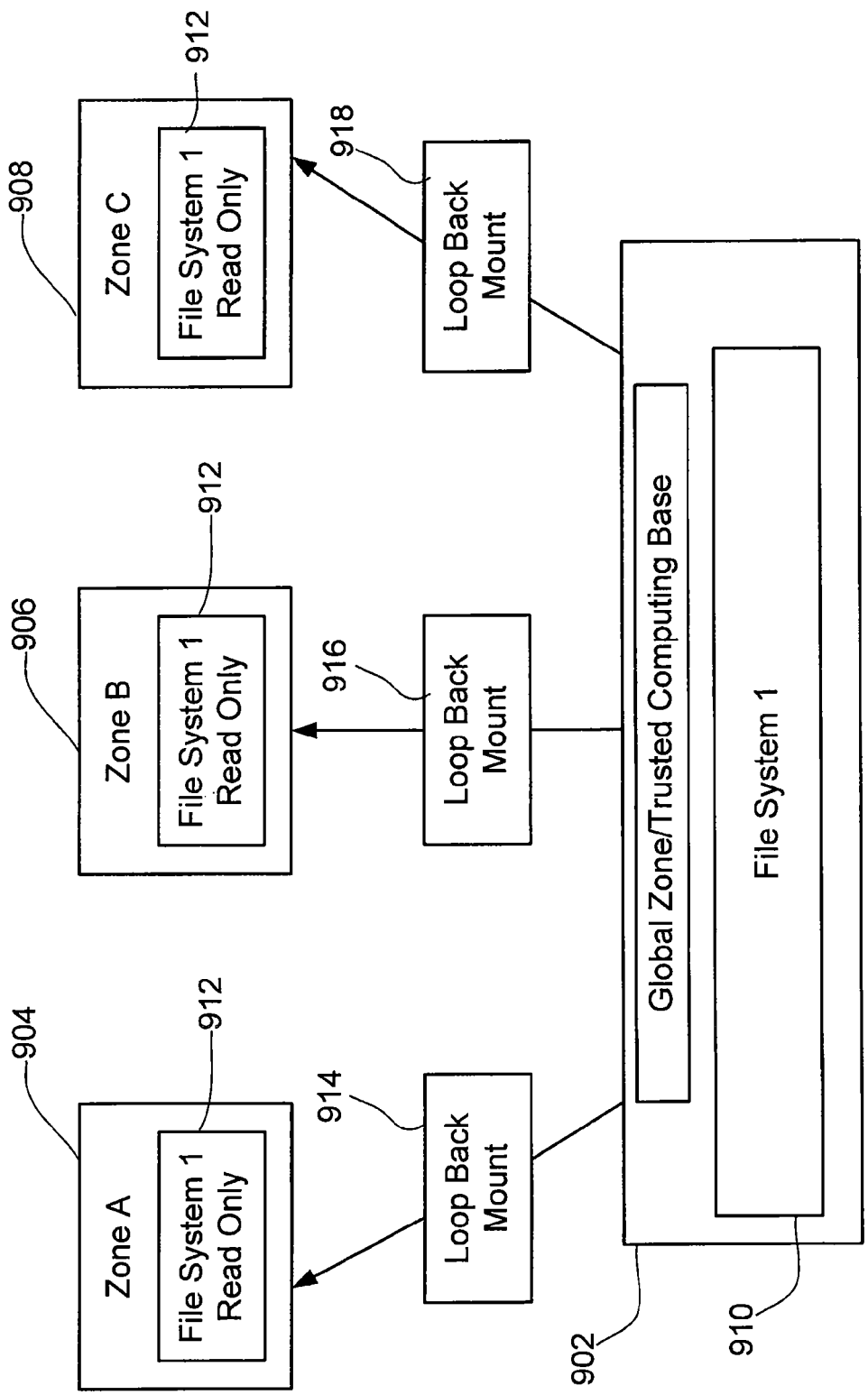

FIG. 9 is a block diagram illustrating the granting of read-only access rights for file systems to zones according to some embodiments. Referring now to FIG. 9, a file system 910 may be made visible to each zone 904, 906, 908. The global zone 902 may contain a file system 910 that may be mounted into a number of zones 904, 906, 908. The file system 910 is mounted as a read-only file system 912 in each of the three zones 904, 906, and 908. This allows for a file system to be shared, but also prevents any user or application from changing the actual binaries or data within the file system. As a result, security may be maintained while resources may be shared.

Figure 10:
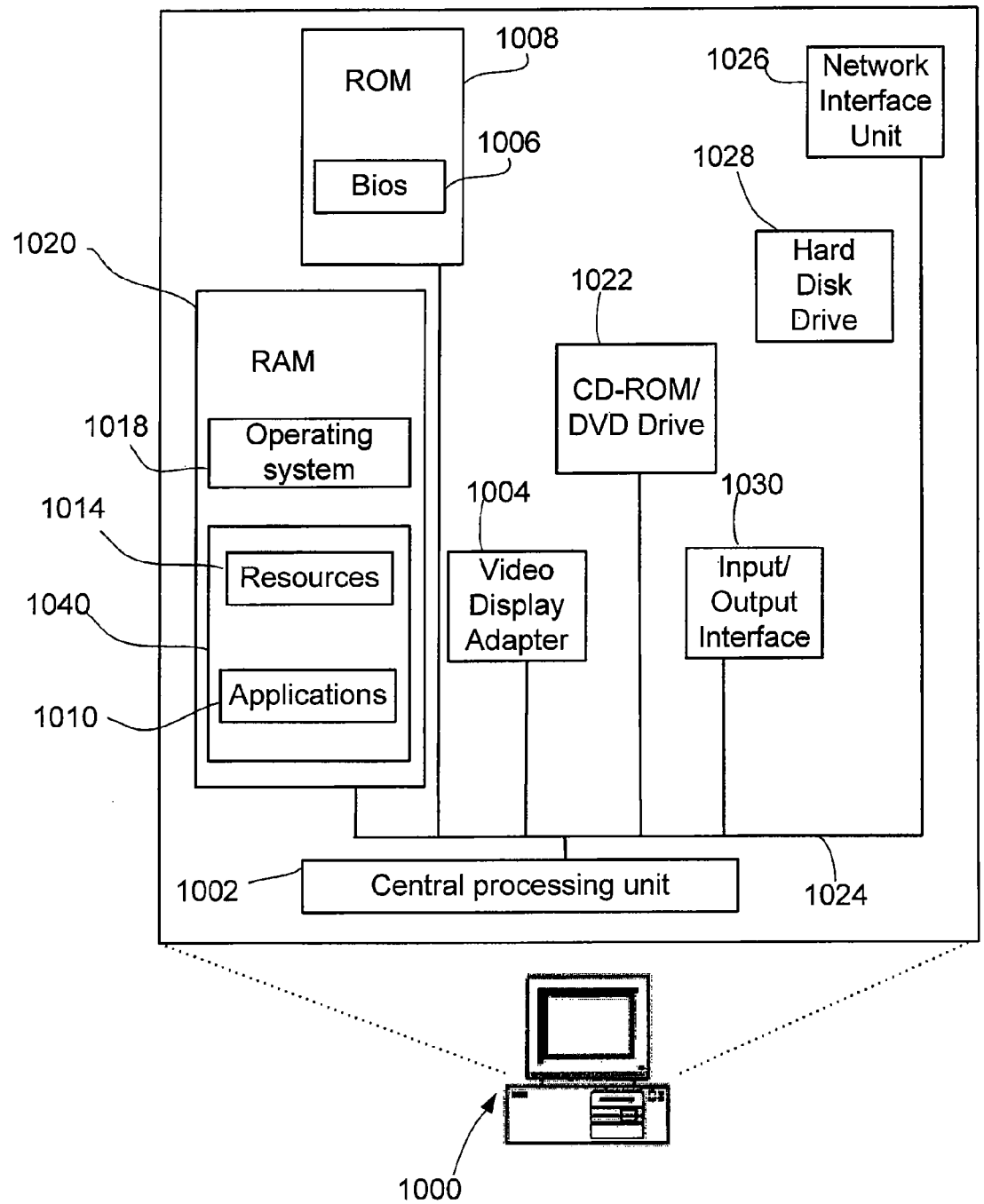
FIG. 10 illustrates a virtual machine showing assigned resources.

FIG. 10 illustrates one embodiment of one machine supporting a zone 1040 of a cluster-wide security container. In some embodiments, the system may have multiple machines. In other embodiments, the system may run on a single machine. The machines used in the other embodiments may be designed similar to the machine illustrated in FIG. 10. Referring now to FIG. 10, a machine 1000 may host multiple zones. In this Figure, the zone 1040 may represent zones 104, 106, or 108 of FIGS. 1A and 1B as well as zones 206, 208, 210, 212, 214, or 216 illustrated in FIG. 2.

The machine 1000, may include processing unit 1002, video display adapter 1004, and a mass memory, all in communication with each other via bus 1024. The mass memory may include RAM 1020, ROM 1008, and one or more permanent mass storage devices, such as hard disk drive 1028, tape drive, optical drive, and/or floppy disk drive. The mass memory may store operating system 1018 for controlling the operation of the machine 1000. The machine 1000 may also include additional software programs or components, which may be expressed as one or more executable instructions stored at one or more locations within RAM 1020, although the instructions may be stored elsewhere. The software programs or components may include applications 1010. The software components may use resources 1014. The software programs or components may include additional applications that are managed by the cluster framework or that use the cluster framework.

Each software component, including operating system 1018 and applications 1010, may be implemented in a number of ways, including a variety of architectures. All, or a portion of, each component may be combined with any other component. Although each component is referred to as an individual component, it is to be understood that in some implementations these may be functional components and instructions or data that implement any component may be combined with instructions or data of any other component, or that different components may share instructions or subcomponents.

As illustrated in FIG. 10, the machine 1000 may also communicate with the Internet, or some other communications network via network interface unit 1026, which may be constructed for use with various communication protocols including the TCP/IP protocol. Network interface unit 1026 is sometimes known as a transceiver, transmitting device, or network interface card (NIC).

The mass memory 1008, 1020, 1022, 1028 described herein and shown in FIG. 10 illustrates another type of computer-readable media, namely computer storage media. Computer storage media may include volatile, nonvolatile, removable, and non-removable media implemented in any method or technology for storage of information, such as computer readable instructions, data structures, program modules, or other data, which may be obtained and/or executed by CPU 1002 to perform one or more portions of process. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that may be accessed by a computing device.

The mass memory may also store other types of program code and data as software programs or components, which may be loaded into mass memory and run on operating system 1018. Examples of application 1010 may include email client/server programs, routing programs, schedulers, calendars, database programs, word processing programs, HTTP programs, RTSP programs, traffic management programs, security programs, and any other type of application program. The machine 1000 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, the machine 1000 may further include applications that support virtually any secure connection, including TLS, TTLS, EAP, SSL, IPSec, or the like. The machine 1000 may also include input/output interface 1030 for communicating with external devices, such as a mouse, keyboard, scanner, or other input/output devices not shown in FIG. 10. Likewise, the machine 1000 may further include additional mass storage facilities, such as CD-ROM/DVD-ROM drive 1022 and hard disk drive 1028. Hard disk drive 1028 may be utilized to store, among other things, application programs, databases, or the like in the same manner as the other mass memory components described above.

The invention claimed is:

1. A multi-level security system, the security system comprising:
    a first cluster-wide security container comprising a first security label, wherein the first cluster-wide security container includes a plurality of first zones each provided by one of a corresponding plurality of computing machines comprising a computer cluster, each first zone configured to provide a first environment where one or more resources of its associated computing machine are processed according to the first security label;
    a second cluster-wide security container comprising a second security label, wherein the second cluster-wide security container includes a plurality of second zones associated with each of the plurality of computing machines, each second zone configured to provide a second environment where the resources of its associated computing machine are processed according to the second security label; and
    a global container including a plurality of global zones associated with the plurality of computing machines, each global zone configured to modify one or more access rights to the resources independently for each of the first security label and the second security label,
    wherein each computing machine comprising a multi-level security (MLS) operating system that supports MLS for a single machine, the MLS operating system including cluster extensions that provide the first environment and the second environment for the first zone and the second zone, respectively, and
    wherein the global zones comprise a cluster configuration repository including configuration information about the first zones and second zones configured on their respective computing machines, wherein access to the cluster configuration repository is not allowed through the first zones or the second zones, and wherein the configuration information for each of the first zones of the first cluster-wide security container and the second zones of the second cluster-wide security container are stored in each of the global zones in the global container, each global zone stored in corresponding computing machines of the computing cluster.

2. The security system of claim 1, further comprising an operating system configured on at least one of the computing machines, wherein the operating system comprises:
a kernel, wherein the kernel is in communication with the at least one computing machine, the first zones, the second zones and the global zones.

3. The security system of claim 1, wherein:
a first of the computing machines hosts one of the first zones and one of the second zones; and
a second of the computing machines hosts another one of the first zones and another one of the second zones;
the first computing machine is in communication with the second computing machine.

4. The security system of claim 3, wherein:
the one first zone includes a first application, wherein the other first zone can access the first application and the one second zone cannot access the first application; and
when the first application fails when running in the one first zone it is restarted in the other first zone.

5. The security system of claim 4, further comprising:
a second application, wherein the first application and the second application have a specified relationship;
wherein when the first application is restarted in the other first zone, a kernel checks the relationship and conditionally starts the second application in the other first zone depending on the specified relationship.

6. The security system of claim 1, wherein only trusted applications run in the global zone.

7. The security system of claim 6, further comprising:
a trusted computing base, wherein the trusted computing base comprises:
the global zone; and
a kernel.

8. The security system of claim 7, wherein the trusted computing base further comprises:
a resource group manager, wherein the resource group manager stores information about at least one of the resources of the computer;
wherein the cluster configuration repository stores data identifying the at least one resource that the first zones and the second zones may access.

9. A method of performing security checks in a computer cluster, the method comprising:
providing a resource of a first computing machine of the computer cluster with a first security label;
configuring a security zone having a second security label on a second computing machine of the computer cluster, wherein the second computing machine includes an application associated with the security zone, the first computing machine and the second computing machine each comprising a multi-level security (MLS) operating system that supports MLS for a single machine, the MLS operating system including cluster extensions that provides the security zone;
providing a kernel on each computing machine, wherein the kernel is in communication with the resource and the security zone;
configuring a global zone on each computing machine, wherein the global zone is in communication with the kernel of its associated computing machine, wherein the global zone comprises a cluster configuration repository including configuration information about the security zones in which access to the cluster configuration repository is not allowed through the security zone, wherein the configuration information for each of the first zones of a first cluster-wide security container and the second zones of a second cluster-wide security container are stored in each of the global zones in a global container, each global zone stored in corresponding computing machines of the computing cluster;
modifying one or more access rights to the resource to be associated with the security zone;
generating a request for access to the resource from the application in the security zone;
adding, using the kernel associated with the second computing machine, data corresponding to the second security label of the security zone to the request;
sending the request to the kernel associated with the first computing machine;
comparing, using the kernel associated with the first computing machine, the second security label of the security zone with the first security label of the resource; and
conditionally allowing, using the kernel associated with the first computing machine, the application access to the resource depending on the comparison of the first security label and the second security label.

10. The method of claim 9, wherein the global zone compares the second security label of the security zone with the first security label of the resource.

11. The method of claim 9, further comprising:
providing a storage device, the storage device has a third security label and the storage device is in communication with the computer cluster.

12. The method of claim 11, further comprising:
generating a request for access to the storage device from the security zone;
sending the request for access to the global zone from the security zone;
adding, using the kernel associated with the global zone, data corresponding to the second security label of the security zone to the request;
comparing, using the kernel associated with the global zone, the second security label of the security zone with the third security label of the storage device; and
conditionally allowing, using the kernel associated with the global zone, the security zone access to the storage device depending on the comparison of the second security label and the third security label.

13. The method of claim 12, wherein the global zone compares the second security label of the security zone with the third security label of the storage device.

14. The method of claim 12, wherein the kernel compares the second security label of the security zone with the third security label of the storage device.

15. The method of claim 12, wherein the first security label and the second security label each comprise a security level and a compartment.

16. The method of claim 15, further comprising:
denying, using the kernel associated with the global zone, the application access to the resource when the second security label has a different security level than the first security label; and
denying, using the kernel associated with the global zone, the application access to the resource when the second security label has a different compartment than the first security label.

17. A tangible, non-transitory storage medium comprising instructions capable of being executed by a computer system, the instructions comprising:
providing a resource of a first computing machine of a computer cluster with a first security label;
configuring a security zone having a second security label on a second computing machine of the computer cluster, wherein the second computing machine includes an application associated with the security zone, the first computing machine and the second computing machine each comprising a multi-level security (MLS) operating system that supports MLS for a single machine, the MLS operating system including cluster extensions that provides the security zone;

providing a kernel, wherein the kernel is in communication with the resource and the security zone;

configuring a global zone on each computing machine, wherein the global zone is in communication with the kernel of its associated computing machine, wherein the global zone comprises a cluster configuration repository including configuration information about the security zones in which access to the cluster configuration repository is not allowed through the security zone, wherein the configuration information for each of the first zones of a first cluster-wide security container and a second zones of a second cluster-wide security container are stored in each of the global zones in the global container, each global zone stored in corresponding computing machines of the computing cluster;

modifying one or more access rights to the resource associated with the security zone;

generating a request for access to the resource from the application in the security zone;

adding, using the kernel associated with the second computing machine, data corresponding to the second security label of the security zone to the request;

sending the request to the kernel associated with the first computing machine;

comparing, using the kernel associated with the first computing machine, the second security label of the security zone with the first security label of the resource; and conditionally allowing, using the kernel associated with the first computing machine, the application access to the resource depending on the comparison of the first security label and the second security label.

18. The tangible storage medium of claim 17, wherein the global zone compares the second security label of the security zone with the first security label of the application.

19. The tangible storage medium of claim 17, further comprising:

configuring a second security zone having the second security label on the first computing machine; and starting a first application in the second security zone of the first computing machine when the first application fails in the security zone of the second computing machine.

20. The tangible storage medium of claim 19, further comprising:

configuring the second security zone to include a second application;

generating a relationship between the first application and the second application;

checking the relationship before starting or stopping the first application; and conditionally starting the second application depending on the relationship.

\* \* \* \* \*